US011282446B2

(12) United States Patent
Curtis et al.

(10) Patent No.: US 11,282,446 B2
(45) Date of Patent: Mar. 22, 2022

(54) GRAPHIC DISPLAY ASSEMBLY FOR VEHICLE ROTARY SHIFTER

(71) Applicant: Kuster North America, Inc., Troy, MI (US)

(72) Inventors: Christopher Edward Curtis, Oxford, MI (US); Michael Benedetto D'Annunzio, Shelby charter Township, MI (US); Brian Andrew Mayville, Northville, MI (US)

(73) Assignee: Kuster North America, Inc., Troy, MI (US)

( * ) Notice: Subject to any disclaimer, the term of this patent is extended or adjusted under 35 U.S.C. 154(b) by 0 days.

(21) Appl. No.: 17/104,544

(22) Filed: Nov. 25, 2020

(65) Prior Publication Data

US 2021/0082342 A1 Mar. 18, 2021

Related U.S. Application Data

(63) Continuation-in-part of application No. 16/574,324, filed on Sep. 18, 2019, now Pat. No. 11,010,120.

(60) Provisional application No. 62/735,498, filed on Sep. 24, 2018.

(51) Int. Cl.

| G09G 3/36 | (2006.01) |
|---|---|
| G09G 3/3208 | (2016.01) |
| G09G 3/20 | (2006.01) |
| G09G 3/34 | (2006.01) |

(52) U.S. Cl.
CPC ......... *G09G 3/3208* (2013.01); *G09G 3/2096* (2013.01); *G09G 3/3413* (2013.01); *G09G 3/36* (2013.01); *G09G 2380/10* (2013.01)

(58) Field of Classification Search
CPC .. G09G 3/3208; G09G 3/2096; G09G 3/3413; G09G 3/36; G09G 2380/10; G09G 3/04; F16H 59/08
See application file for complete search history.

(56) References Cited

U.S. PATENT DOCUMENTS

| 6,568,345 | B1 | 5/2003 | Paulo |
| 7,847,680 | B2* | 12/2010 | Gencyuz ................. F16H 59/02 340/456 |
| 8,812,207 | B2 | 8/2014 | Wagoner et al. |
| 9,539,940 | B2 | 1/2017 | Salter et al. |
| 2003/0029261 | A1* | 2/2003 | DeJonge ................ B60K 37/06 74/335 |
| 2004/0207607 | A1 | 10/2004 | Specks et al. |

(Continued)

FOREIGN PATENT DOCUMENTS

DE 10048577 A1 4/2002

*Primary Examiner* — Antonio A Caschera
(74) *Attorney, Agent, or Firm* — Dinsmore & Shohl LLP

(57) ABSTRACT

A graphical display integrated into a rotary knob vehicle shifter assembly including a surface display located outside of the knob which can incorporate any of transistor LCD or organic LED interior components, such as which can be presented into either of segmented or OLED/TFT pixelated image display variants. In either instance, a connector end of an associated harness or ribbon cable extends from the graphical display and, when connected to a remote PCB board integrated into the shifter assembly, is configured to provide variable display options not limited to shifter position and including variable supporting graphics and other designs.

14 Claims, 15 Drawing Sheets

(56) References Cited

U.S. PATENT DOCUMENTS

| | | | |
|---|---|---|---|
| 2010/0013621 A1* | 1/2010 | Kazyaka | F16H 63/42 |
| | | | 340/456 |
| 2017/0274765 A1 | 9/2017 | Woodhouse et al. | |
| 2018/0003294 A1 | 1/2018 | McGuire et al. | |
| 2018/0143754 A1 | 5/2018 | Niazi | |

* cited by examiner

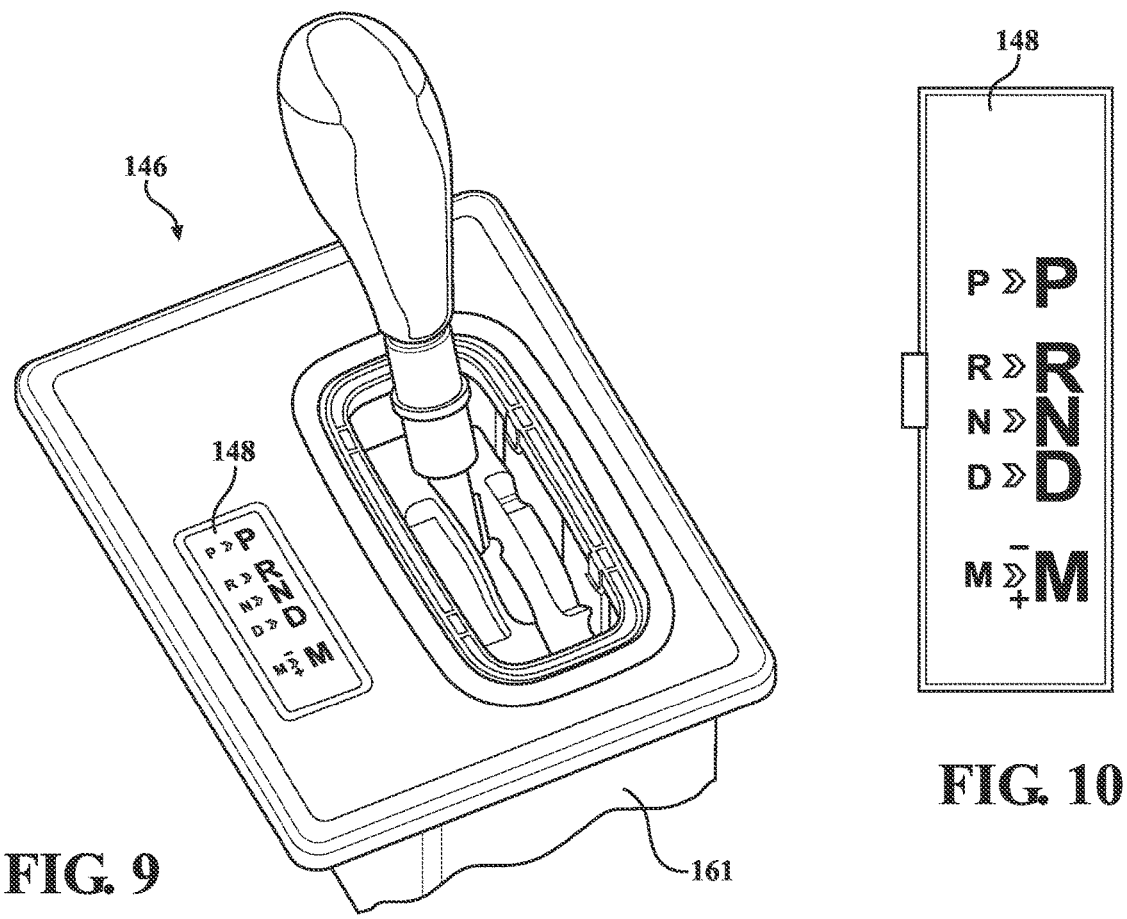
FIG. 9
FIG. 10
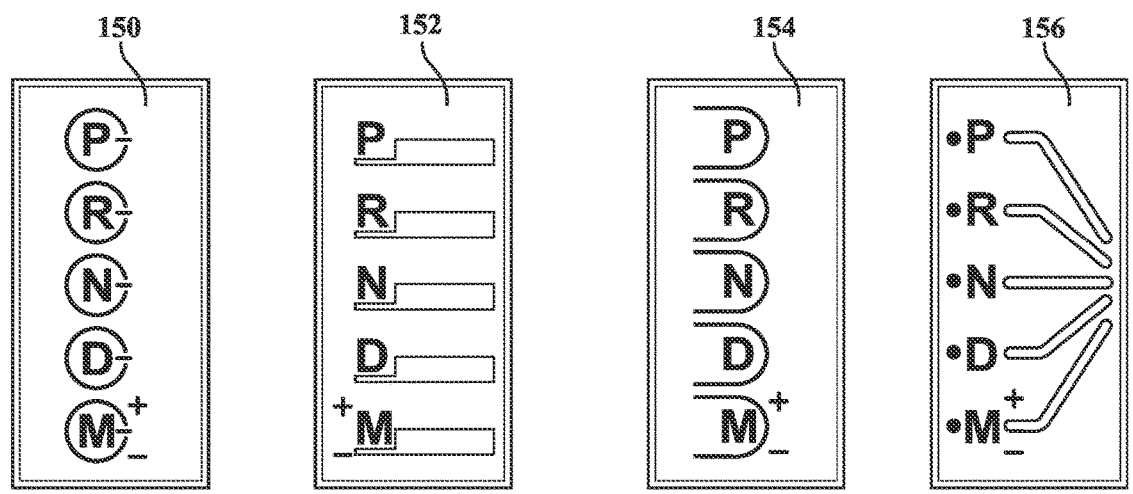
FIG. 11A   FIG. 11B   FIG. 11C   FIG. 11D

GRAPHIC DISPLAY ASSEMBLY FOR VEHICLE ROTARY SHIFTER

CROSS REFERENCE TO RELATED APPLICATION

The present is a continuation-in-part application which claims the priority of U.S. Ser. No. 16/574,324 filed Sep. 18, 2019. The '324 application claims the priority of U.S. Ser. No. 62/735,498 filed Sep. 24, 2018.

FIELD OF THE INVENTION

A graphical display assembly, such as incorporated into an off-rotary knob shifter, such including lever, push button, column shift functionality, and which replaces illuminating features incorporated into traditional shifter assemblies. The graphical display assembly and associated applications provide for either of segmented or TFT/OLED (thin film transistor or organic light emitting) display variants for adapting the surface dial illumination associated with any configuration of shifter display to provide for any non-limiting depictions to accurately and effectively indicate shifter position.

BACKGROUND OF THE INVENTION

The prior art is documented with examples of lighting displays for vehicle shifter assemblies. A common example of these utilize light emitting elements located on a PCB circuit board integrated into a known shifter assembly, the PCB communicated via a plurality of light pipes for tunneling individual light pathways to a dedicated painted and etched surface display which is incorporated into either of a rotating shifter knob display face or dial, or configured astride a linearly adjustable shifter lever display surface/dial.

With reference to FIG. 5, a Prior Art example (such as referenced above) is depicted of an existing shifter assembly and includes a housing partially represented in phantom at 2 for incorporating the various structural components associated with the working of the shifter assembly (not shown). A cover 4 is depicted for attaching over an open top rim of the housing 2, the cover including an annular upward projection 6 defining in turn an open upper rim edge 8. A printed circuit board assembly 10 (PCBA) is provided and supported at the bottom of the well inside of the cylindrical projection 6. The PCBA (printed circuit board assembly) 10 integrates a configuration of LED style elements, examples of which are shown at 12, 14, 16, et seq. In other variations, the PCBA can be relocated to a bottom interior of the main supporting housing 2.

A pad 18, similar in shape to the PCBA 10, is depicted and can be supported in stacked fashion upon the PCBA. A light pipe frame 20 is stacked above the pad 18 (such being light permissible via cutouts our having any transparent or translucent properties), the frame 20 including individually configured support locations 22, 24, 26, 28 for in turn receiving respective light pipes 30, 32, 34 and 36 such as associated with any of PRND (park, reverse, neutral and drive) gear shift positions.

A lens 38 is provided in installed fashion over the frame 20 (such as seating flush upon the rim edge 8 of the cylindrical projection 6), the frame in turn seating the light pipes 22-28 for communicating the LED illumination of the buried PCBA to the surface display represented by the lens. An interior annular rim edge 40 of the lens 38 is also configured to seat a Sport button 42 for defining a further shifter designation (such as in combination with an additional light pipe in communication with a suitable PCBA located LED or like illuminating element).

Disadvantages of the current design include the requirement of painting/repainting or laser etching the desired shifter position designations into the lens other display covering. Other shortcomings include the attendant costs and additional part content, such as in particular for the light pipes and supporting light pipe frame for communicating the illumination from the PCBA mounted LED's to the etched surface locations (i.e. PRND).

Other examples derived from the prior art include Paulo, U.S. Pat. No. 6,568,345, which teaches a cluster display backlight source set on a PCB and which includes a microcontroller for controlling the lights and sending display information to each cluster. The clusters are mounted on a single support or frame. A rotating mechanism controlled by the driver moves the selected cluster into the line of sight of the viewing surface, which is backlighted and evenly spread by a reflector across the cluster. The light source is set on a PCB incorporating a microcontroller for controlling the lights and sending display information to each cluster.

Specks, US 2004/0207607 teaches an integrated display which is programmable. Niazi, US 2018/0143754 further teaches a flat touch-sensitive electronic screen built into the steering wheel and including a graphic user interface for controlling vehicle operations.

SUMMARY OF THE PRESENT INVENTION

The present invention discloses an improved graphical display for incorporating into an off knob location of a rotary shifter assembly for providing identification of a shifter position. The improved display can incorporate any of thin film display (TFT), transistor LCD, or organic LED (OLED) display variants and which allows for any representation not limited to color, pattern or intensity to be created within a display surface geometry. The present invention further allows for the use of a clear display surface (not having any painting or etching associated with known shifter position indications PNRD) and which is only limited by operating software communicated from the associated circuit board and microcontroller.

In each variant, a display housing is located remote from the PCBA and can incorporates a plurality of LED or suitable illuminating components. A harness and end connector extending from the surface display housing connects to the PCBA, with the surface display in one variant being generically provided without any specific etched or painted representations and which is modifiable in both color and intensity based upon the inputs received from the PCBA to achieve a desired illumination scheme.

An alternate variant provides a segmented display in which the harness is substituted by a ribbon extending from the PCBA to the (LED or LCD enabled) display surface and by which individual wires within the ribbon illuminate are communicated to selected segments of the display surface. In this manner, and based upon the collection of individual inputs communicated from the main microcontroller located on the PCBA, a desired illumination scheme is achieved.

Additional features include the programmed surface display (such as associated with OLED/TFT variants) depicting a current selected gear shown in enlarged depiction in the center of the graphical display. The PCBA board may further include a main microcontroller with a serial communication protocol not limited to any of LIN, SPI, and 12C. Other features include the PCBA board exhibiting a main microcontroller with a serial communication protocol not limited to any parallel interface established between the main microcontroller and the graphic display.

BRIEF DESCRIPTION OF THE DRAWINGS

Reference will now be made to the attached drawings, when read in combination with the following detailed description, wherein like reference numerals refer to like parts throughout the several views, and in which:

FIG. 9 is an illustration of a linear gate style shifter assembly utilizing the graphical display subassembly;

FIG. 10 is a sectional illustration of a rectangular shaped display surface incorporating any of the segmented or TFT/OLED style displays consistent with those described throughout FIGS. 1-9;

FIGS. 11A-11D illustrate varying examples of color and pattern schemes applicable to any shifter surface display;

DETAILED DESCRIPTION OF THE PREFERRED EMBODIMENTS

Figure 5:
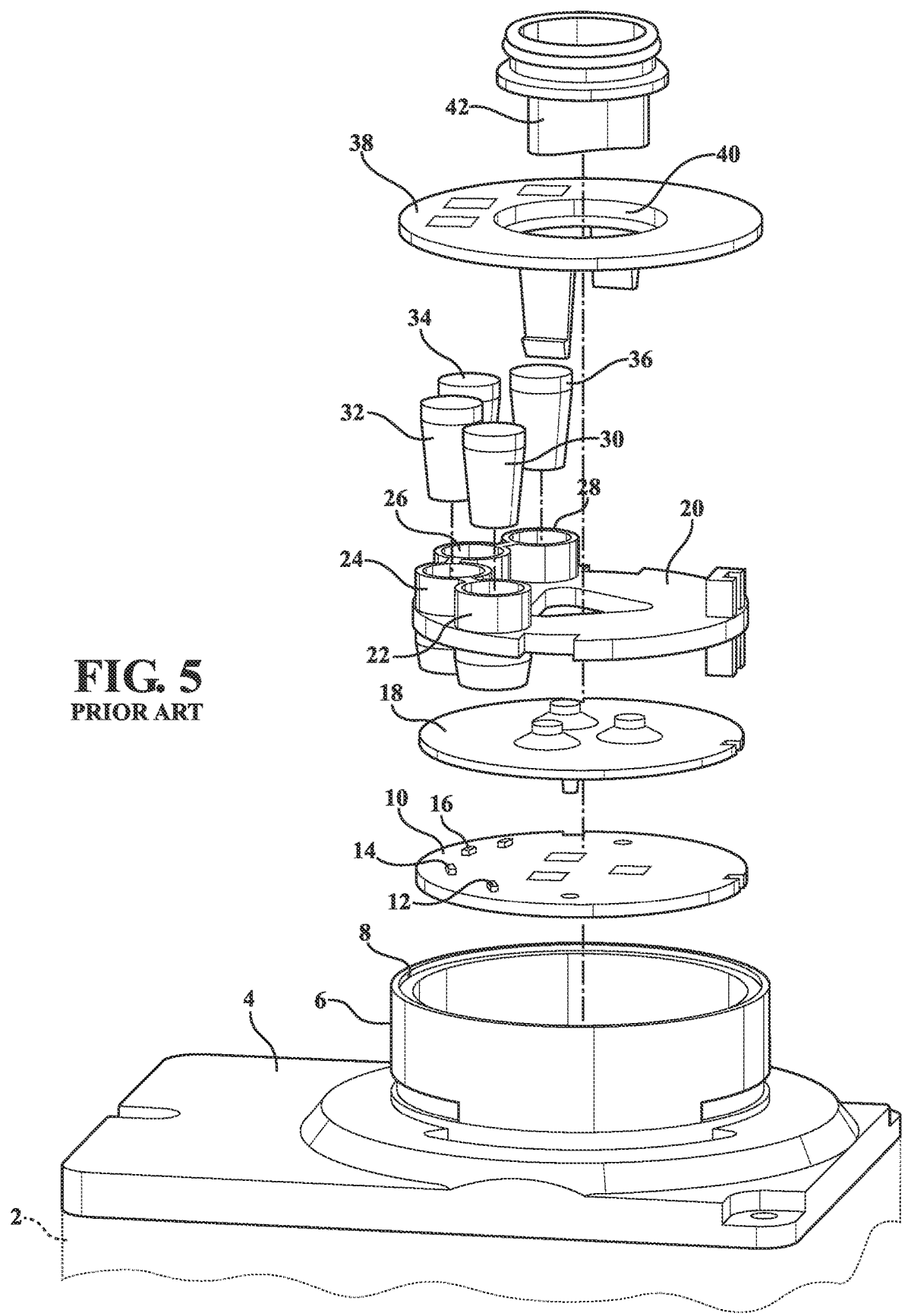
FIG. 5 is a Prior Art illustration of a shifter assembly by which each of shifter gear indication and gear position are managed by various components including color and brightness varying LED elements mounted directly to the PCBA, in addition to light pipes extending between the PCBA and an etched or painted surface of the shifter display in order to illuminate the desired shifter position.

With reference to the appended illustrations, the present invention discloses a novel graphical display system which replaces existing Prior Art shifter assembly designs, such as previously referenced in FIG. 5. More specifically, the present invention replaces the use of traditional light-emitting diodes integrated into the PCBA and requiring lighting pipes or sliding color screens which communicate the illumination of LED's to a remote surface located screen display (such further being etched or painted in order to provide a specific shifter position designation PNRD, with a cheaper, easier produced and adaptable display subassembly which can be configured from any of a thin film transistor, printed LCD and/or organic LED components (collectively referenced as a "pixelated image") or, alternatively, a segmented display contained within a graphic display assembly which is connected to a PCB via a connector, and in order to provide more varied options for creating different illuminating display surfaces which are not limited to those depicted by the existing assemblies.

Figure 3:
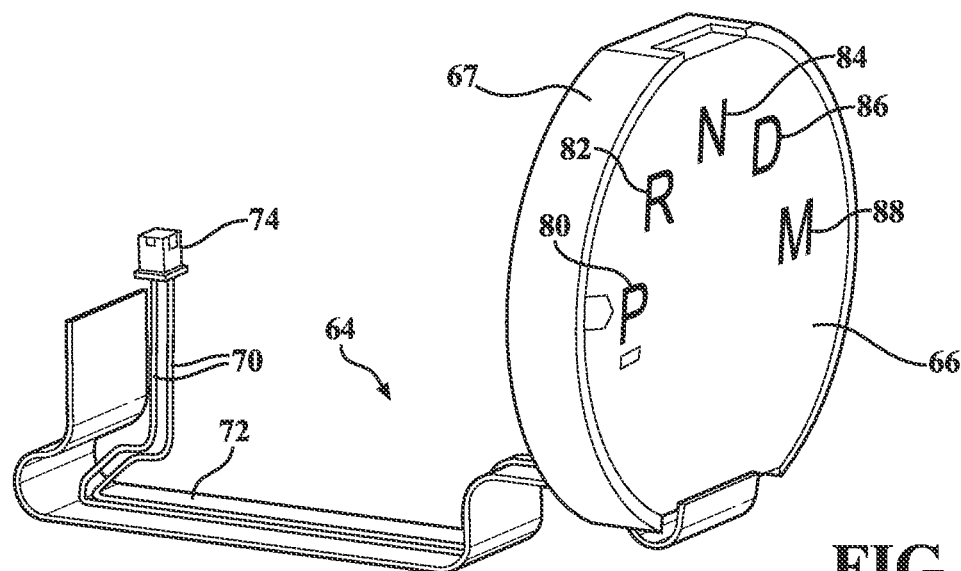
FIG. 3 is a perspective of a display subassembly as depicted in FIG. 2 and which can include any variation of either of segmented or TFT/OLED displays which are capable of being illuminated via signals originating from the remote located printed circuit board assembly (PCBA) via the associated connector.
Figure 4:
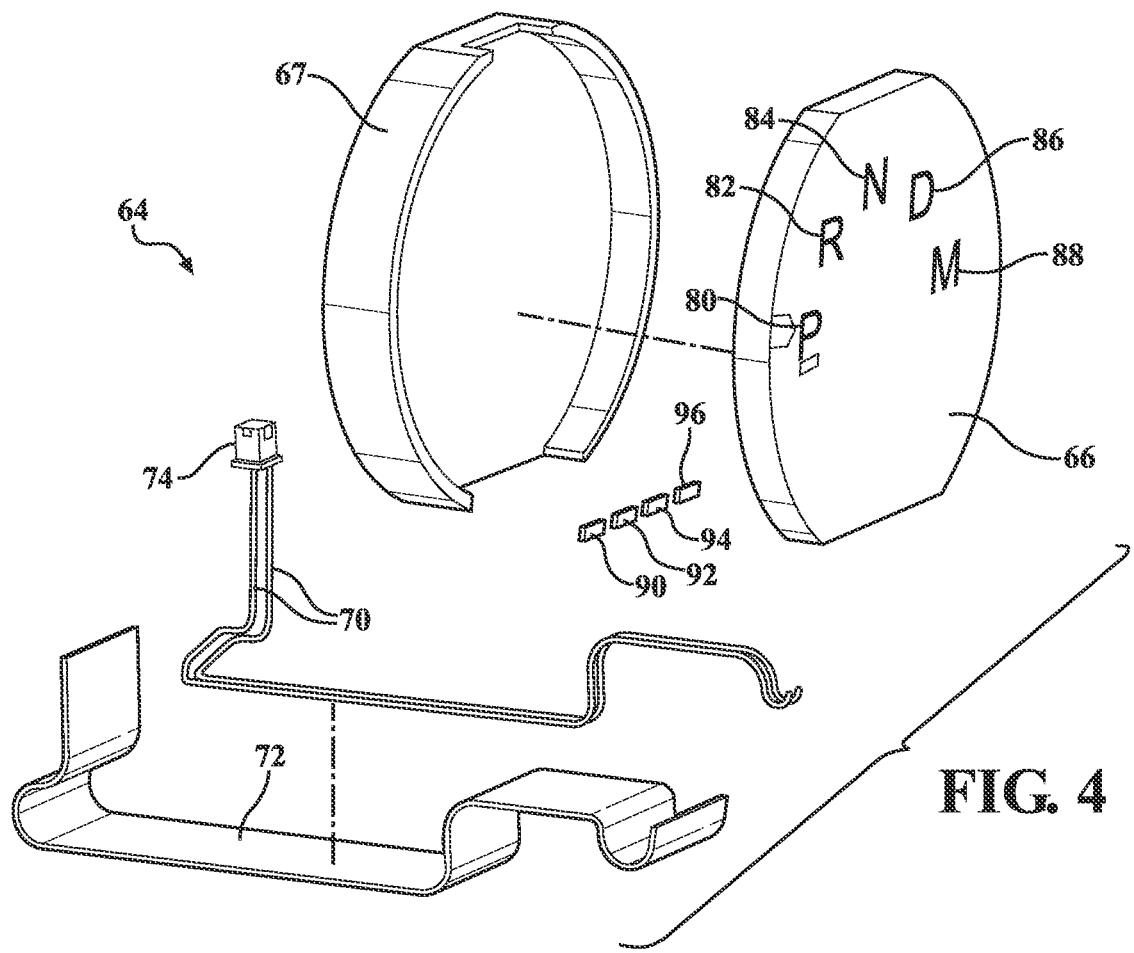
FIG. 4 is an exploded perspective of FIG. 3 and better depicting either of alternate versions of a display subassembly utilizing a backlit/LED wire harness for a TFT/OLED display or, alternatively, a cable ribbon extending from a segmented display in which selected areas of the display are selectively illuminated by instructions issued by the PCBA via the connector.

By way of general explanation of the known technical art, a thin-film transistor (TFT), such as which can be incorporated into the displays of FIGS. 3-4, is a special kind of MOSFET (metal-oxide-semiconductor field-effect transistor) made by depositing thin films of an active semiconductor layer as well as the dielectric layer and metallic contacts over a supporting (but non-conducting) substrate. A common substrate is glass, because the primary application of TFTs is in liquid-crystal displays (LCDs). This differs from the conventional bulk MOSFET transistor, where the semiconductor material typically is the substrate, such as a silicon wafer.

An organic light-emitting diode (OLED or Organic LED), also known as an organic EL (organic electroluminescent)

diode, is a light-emitting diode (LED) in which the emissive electroluminescent layer is a film of organic compound that emits light in response to an electric current. This organic layer is situated between two electrodes; typically, at least one of these electrodes is transparent. OLEDs are used to create digital displays in devices such as television screens, computer monitors, portable systems such as smartphones, handheld game consoles and PDAs. A major area of research is the development of white OLED devices for use in solid-state lighting applications.

There are two main families of OLED: those based on small molecules and those employing polymers. Adding mobile ions to an OLED creates a light-emitting electrochemical cell (LEC) which has a slightly different mode of operation. An OLED display can be driven with a passive-matrix (PMOLED) or active-matrix (AMOLED) control scheme. In the PMOLED scheme, each row (and line) in the display is controlled sequentially, one by one, whereas AMOLED control uses a thin-film transistor backplane to directly access and switch each individual pixel on or off, allowing for higher resolution and larger display sizes.

An OLED display works without a backlight because it emits visible light. Thus, it can display deep black levels and can be thinner and lighter than a liquid crystal display (LCD). In low ambient light conditions (such as a dark room), an OLED screen can achieve a higher contrast ratio than an LCD, regardless of whether the LCD uses cold cathode fluorescent lamps or an LED backlight.

Finally, and as is generally known, segmented displays, also termed LCD displays, static displays or glass-only displays, are constructed of two pieces of ITO (Indium tin oxide) glass with a twisted nematic fluid sandwiched in between. A static display is a segment display with one pin for every one segment. Further reference to examples of LCD segmented displays will be further had with reference to FIGS. 4A-4C.

A liquid-crystal display (LCD) is a flat-panel display or other electronically modulated optical device that uses the light-modulating properties of liquid crystals. Liquid crystals do not emit light directly, instead using a backlight or reflector to produce images in color or monochrome. LCDs are available to display arbitrary images (as in a general-purpose computer display) or fixed images with low information content, which can be displayed or hidden, such as preset words, digits, and seven-segment displays, as in a digital clock. They use the same basic technology, except that arbitrary images are made up of a large number of small pixels, while other displays have larger elements. LCDs can either be normally on (positive) or off (negative), depending on the polarizer arrangement. For example, a character positive LCD with a backlight will have black lettering on a background that is the color of the backlight, and a character negative LCD will have a black background with the letters being of the same color as the backlight. Optical filters are added to white on blue LCDs to give them their characteristic appearance.

Figure 1:
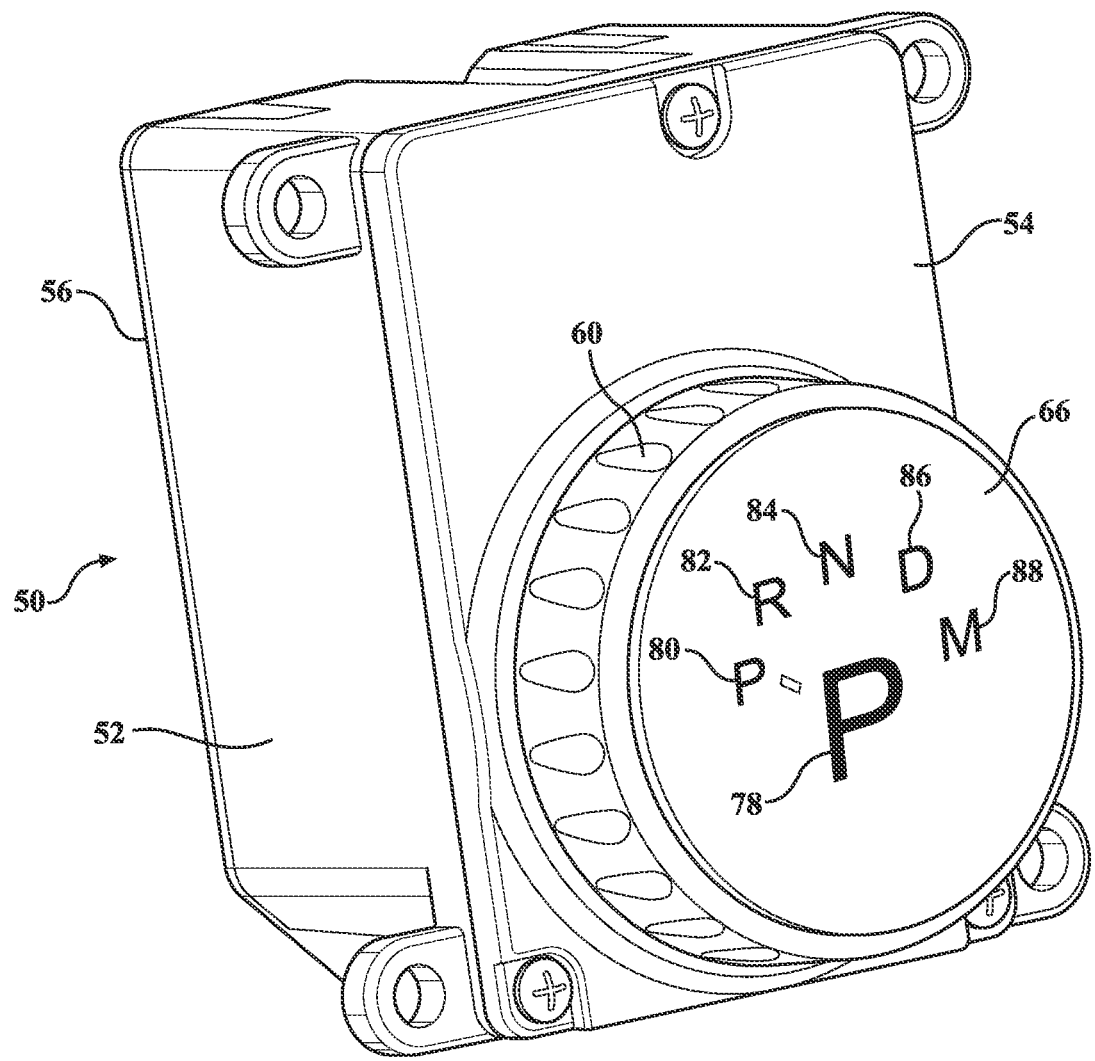
FIG. 1 is a perspective view of a rotary shifter assembly housing according to one non-limiting variant of the present invention.
Figure 2:
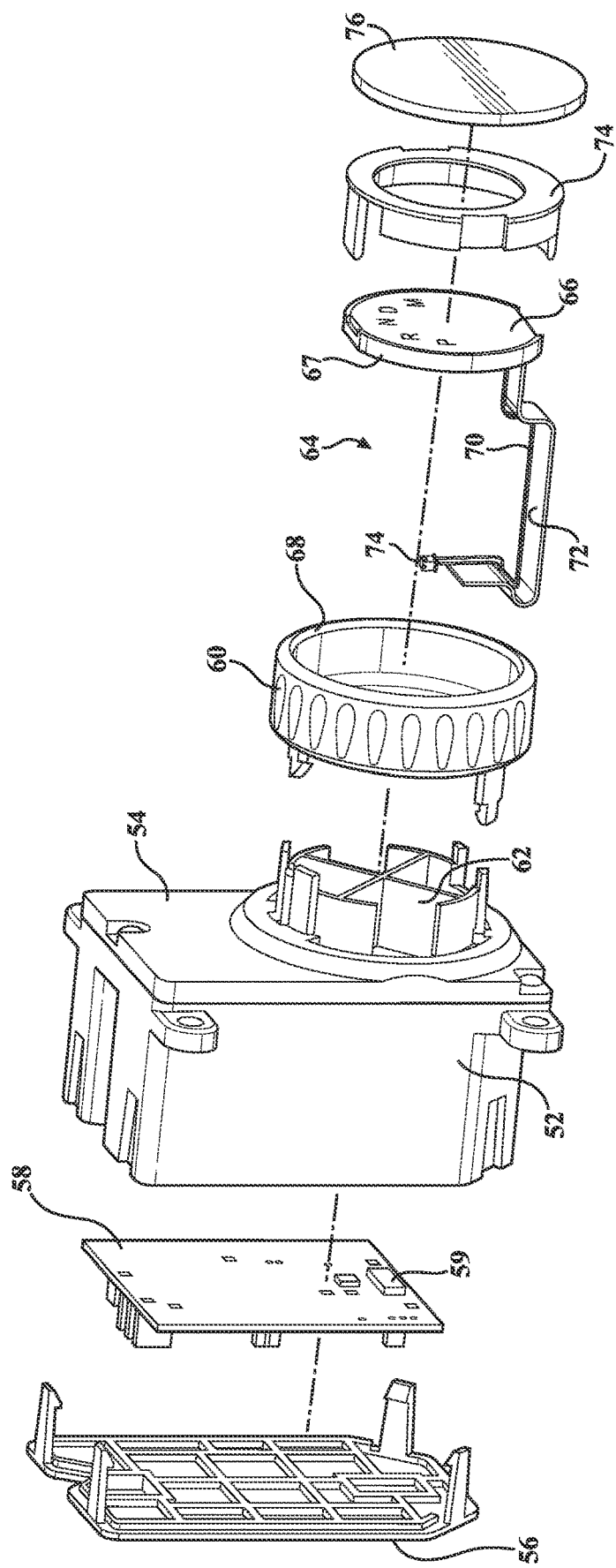
FIG. 2 is an exploded view of the shifter assembly of FIG. 1.

Given the above general explanations of know versions of TFT, OLED (collectively termed pixelated image created) and LCD printed segmented displays utilized in the present invention, such a display subassembly is generally represented in FIG. 3 (as well as in exploded view in FIG. 4) and is in turn incorporated into a reconfigured shifter assembly depicted in perspective in FIG. 1 generally at 50 and in exploded fashion in FIG. 2. Components of the overall assembly include a main housing (shifter core) having a generally rectangular body 52 with a lid 54 and bottom cover 56 to configure an interior 52 for supporting the package components of the assembly. Among these are included an interior mounted printed circuit board assembly 58 (PCBA) which is typically located proximate the bottom cover 56 and which can include a built in main microcontroller 59 or other suitable processor component.

A shifter handle subassembly 60 is provided which secures to the lid 54 via annular shaped receiving structure 62. A display subassembly, generally represented at 64 and forming a portion of the present invention, includes a display surface 66 which is supported within a subset frame or housing 67 which in turn mounts within a mating inner support surface 68 of the handle subassembly 60 forming a portion of the main shifter body. Without limitation, the housing 67 can be provided as a metal, plastic or other suitable material, with the display surface 66 any type of image glass within which is integrated the desired segmented or TFT/OLED display. As will be further described, variations of the display subassembly can include a wire harness (see pair of wires collectively represented at 70) and/or a segmented ribbon 72, an end connector 74 configured at the end of the wires 70 for engaging an output location of the PCBA 58 in communication with a main microcontroller component of the PCBA 58.

A closeout display 79 forms a portion of the overall display subassembly 68 and encloses the display subassembly display surface 66 and surrounding frame housing 67. A lens 76 is also provided and covers the display 75 in a manner which transparently reveals and protects the display surface 66.

As depicted in FIG. 1, the display subassembly 64 is provided separate from the main PCBA 58 and would likely communicate with the main microcontroller on the main PCBA via such as a serial communication protocol (LIN, SPI, 12C, etc.). Alternatively, a parallel interface is envisioned between the main microcontroller/PCB and the graphic display 66 in substitution for the above listed serial communication options. In such an application, the main microcontroller/PCB to graphic display interface will initially be parallel, with the ribbon style cable 72 extending from the graphic display and connecting into an input location for the PCB using the appropriate mating connector 74. As further understood, the ribbon cable will have a wire for each individual LED/LCD segment controlled by the main microcontroller and so that subset areas of the display surface 66 are illuminated based upon the collection of outputs provided from the PCBA 58.

In comparison to the prior art variants of known shifter assemblies (again referencing FIG. 5), the display subassembly of the present assembly both reduces part content as well as enables the ability to provide higher quality graphics. This can also include the display indicating a large character for the current E-shift position in the center of the screen (see as designated at 78 for P or park position in FIG. 1), with the non-current characters indicated in smaller font in their relative positions above the enlarged currently indicated position (see further at 80, 82, 84, 86 and 88 for each of P, R, N, D and M positions.

Reiterating the above description, a TFT/OLED (thin film transistor or organic light emitting diode) display subassembly permits provision of a display surface 66 selected from the above referenced options and which not required to be pre-etched or painted with the various letter designations, thereby allowing varying representations at the display location 78 selected from the options peripherally located at 80-88. In this fashion the image sets and colors are controlled through the main PCBA 58 and the TFT/OLED display can be variably changed to any image sets contained within the PCBA memory.

Figure 4A:
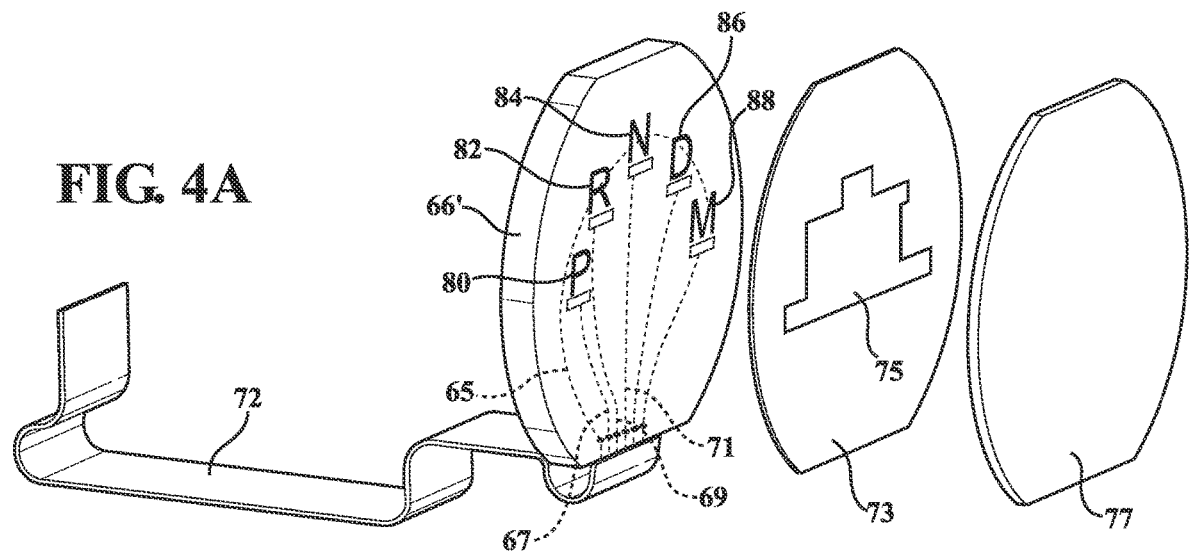
FIG. 4A is an exploded view of a segmented display variant with base LCD layer with ribbon circuits to LCD segments, intermediate silkscreen polarizer layer with example of polarizer to cover white LCD slots with red silkscreen and top glass layer.
Figure 4B:
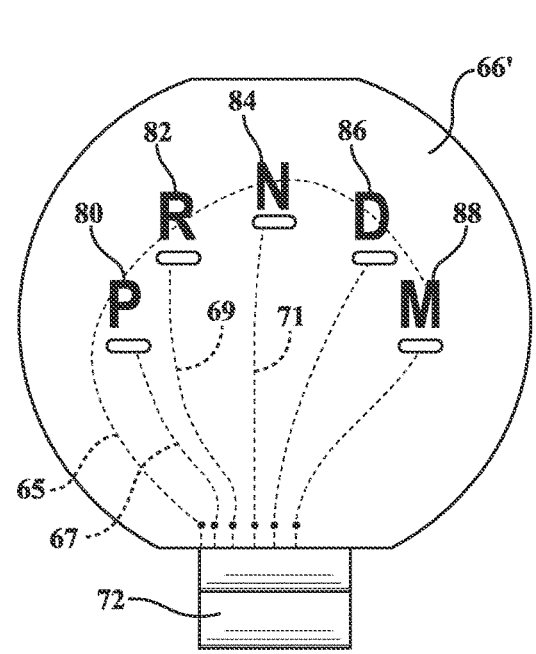
FIG. 4B is a plan view of the LCD layer with LCD segments and ribbon cable circuits.
Figure 4C:
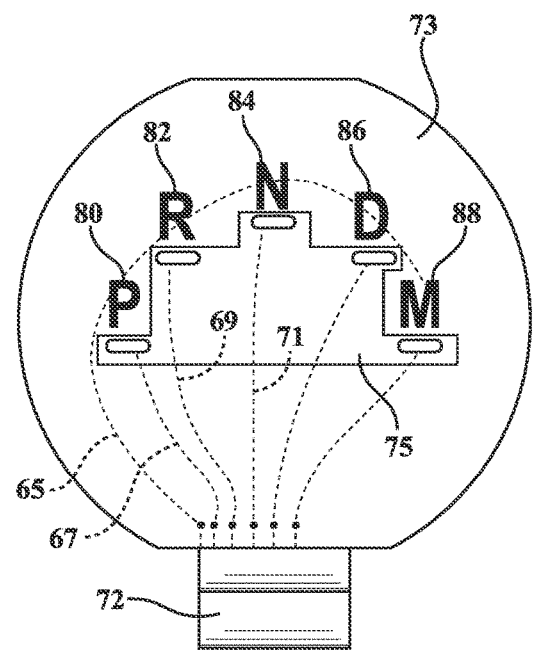
FIG. 4C is a plan view of the silkscreen polarizer layer applied over the LCD layer.

With further reference to FIGS. 4A-4C, in a segmented LCD display shown in FIG. 4A at 65, 67, 69, 71, etc., are circuits which connect the FPC ribbon cable channels to appropriate segments for activation. The LCD segments further correspond to the shifter position lettering again referenced at 80, 82, 84, 86, 88, etc., which are specifically printed in the representation desired associated with a variant 66' of the display surface (see as compared to at 66 in FIG. 3).

A silkscreen 75 is laminated onto a polarized layer 73 to provide the color desired when the LCD for the desired segment is activated and so that the representation desired is specifically tooled and contained within the display subassembly, and further such that any change in color for various segments would require a silkscreen of that desired color to be located on the polarized layer over the LCD segment(s). Also depicted in the exploded view of FIG. 4A is a top glass layer 77, such as which can be correspondingly integrated into the variant 64 of FIG. 3 which can include any suitable TFT/OLED display. Without limitation, each vehicle platform or desired difference in image to display selected would be a separately tooled display, but could be packaged in the exact same shifter only requiring adjustments to the software to control the newly tooled display.

Referring again to FIG. 3, a perspective of the display subassembly 64 depicted in the overall shifter assembly of FIG. 2 can again include any variation of either of a segmented display (via ribbon 72) or TFT/OLED displays (via harness 70) which are capable of being illuminated via signals originating from the remote located printed circuit board assembly (PCBA 58) via the associated connector which is represented at 74 at the end of the harness 70 (with the ribbon style cable 72 usually being connected in a varying fashion to the PCBA 58 in communication with its microcontroller and outputs). While the present invention contemplates the variants in which aspects of different types of displays can be combined, these are typically provided as alternate options.

FIG. 4 again provides an exploded perspective of FIG. 3 and better depicting the wire harness 70 for operating the LED's associated with the segmented display. The cable ribbon 72 us further utilized on the segmented display in order to control/activate the segments desired for allowing the LED lights 90-96 to pass through. In the alternative variant of TFT/OLED display, the LED controls are built into the ribbon cable communication.

The internal LCD board within the display has the printed circuits and printed LCD segments contained for the exact image desired. Additional to the reduction in part content such as associated with a Prior Art version of shifter assembly depicted in FIG. 5, the display subassembly 64 provides the added quality control benefits of establishing better color consistency in the displays, as well as avoiding issues of paint and etch wearing in the display surface, light bleeding and the like. As such, the display screen 66 operates without any pre-etching or painting of the surface in order to provide the desired shifter location designations or additional supporting design indicia.

Also generally represented at 90, 92, 94, and 96 are a collection of illuminating elements (such as including but not limited to LED style elements) and which, of note, are incorporated into the display subassembly housing 67 rather than being located at the remote PCBA 58 which would otherwise require use of the additional light pipes and supporting structure. The configuration of the LED (or alternate LCD) lighting elements is such that they integrate into the display subassembly and communicate with locations of the TFT/OLED or other display composition in order to respond to the signals issued by the PCBA 58 in order to vary the visual representations. In this manner, the display glass or other surface 66 can present any desired pixelated image (TFT) or LCD segmented image (segmented display).

Figure 6:
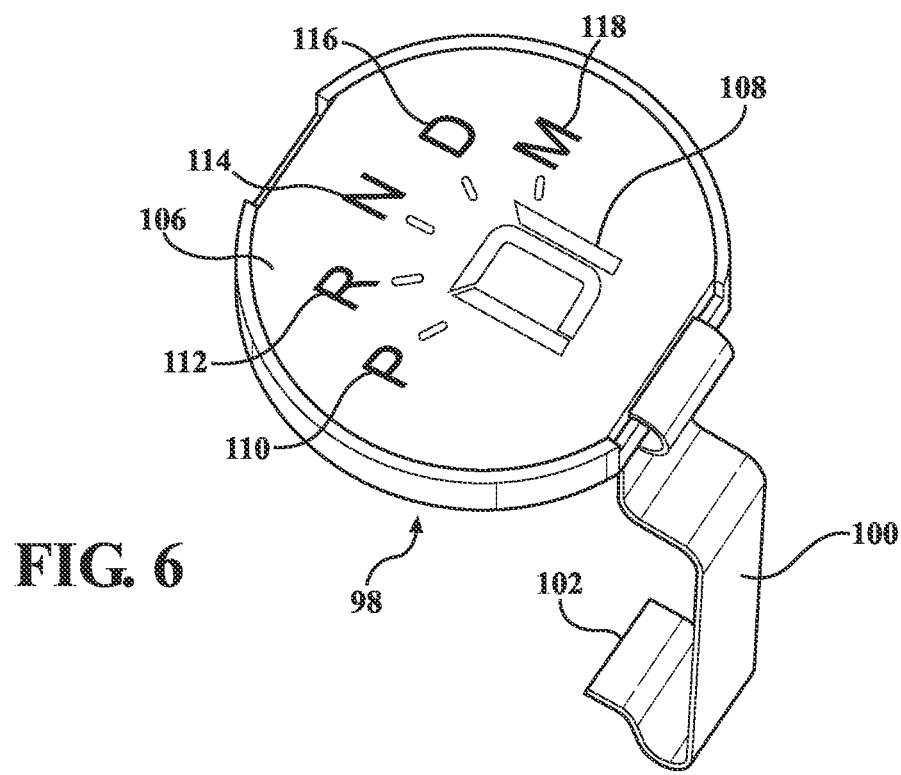
FIG. 6 is an illustration of the graphical display such as incorporating the segmented cable ribbon derived from FIG. 4 and again integrated into a rotary shifter housing.
Figure 7:
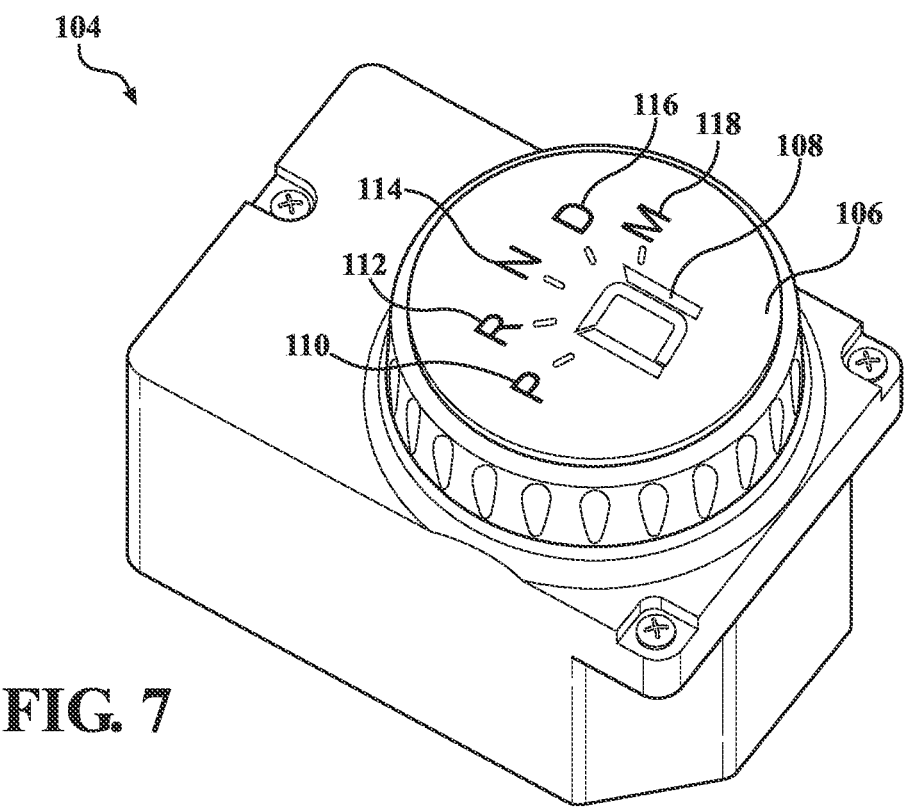
FIG. 7 is an illustration of a rotary shifter assembly similar to that shown in FIG. 1 and depicting an alternately configured surface variation of an integrated display.

FIG. 6 is an illustration of a modified version of a graphical display subassembly, generally at 98, such as incorporating a variation of a segmented cable ribbon 100 (similar to that derived from FIG. 4 with an end situated connector location 102). The display subassembly is shown integrated into another variation of a rotary shifter housing, generally at 104 in FIG. 7, and again depicting an alternately configured surface variation of an integrated display in which the graphical display surface 106 can include an enlarged designation 108 (see as D1) selected from peripheral designations 110-118 for each of PRNDM shifter positions.

Again, the enlarged selected or peripheral menu position displays are understood to be generated by the software inputs from the PCBA and associated micro-controller such that a TFT/OLED variant display surface 106 is otherwise clear (non-etched or painted) and such that any possible graphical depiction or styling is possible including changing future depictions presented on a given display surface simply by changing the software inputs. This can include the option for the vehicle operator to vary any of color, intensity, script and/or size of the shifter positions indicated, as well as the ability to change any supporting graphics or commercial representations associated with the vehicle type and model.

Again, and with alternate reference to a segmented display surface, the associated controls allow for activation/deactivation of preprinted segments on the internal segmented display circuit. Brightness is also controlled through the shifter PCBA in communication with the LEDs. Color is controlled by silkscreens that are predetermined from design to design, images are predetermined based on the design. If new images are desired from platform to platform or customer to customer, a different segmented display circuit and silkscreen set would be needed, the shifter PCBA software for control and communication would be updated, but the remainder of the shifter could be common (which is not true for light pipe/traditional style shifter displays).

Figure 8A:
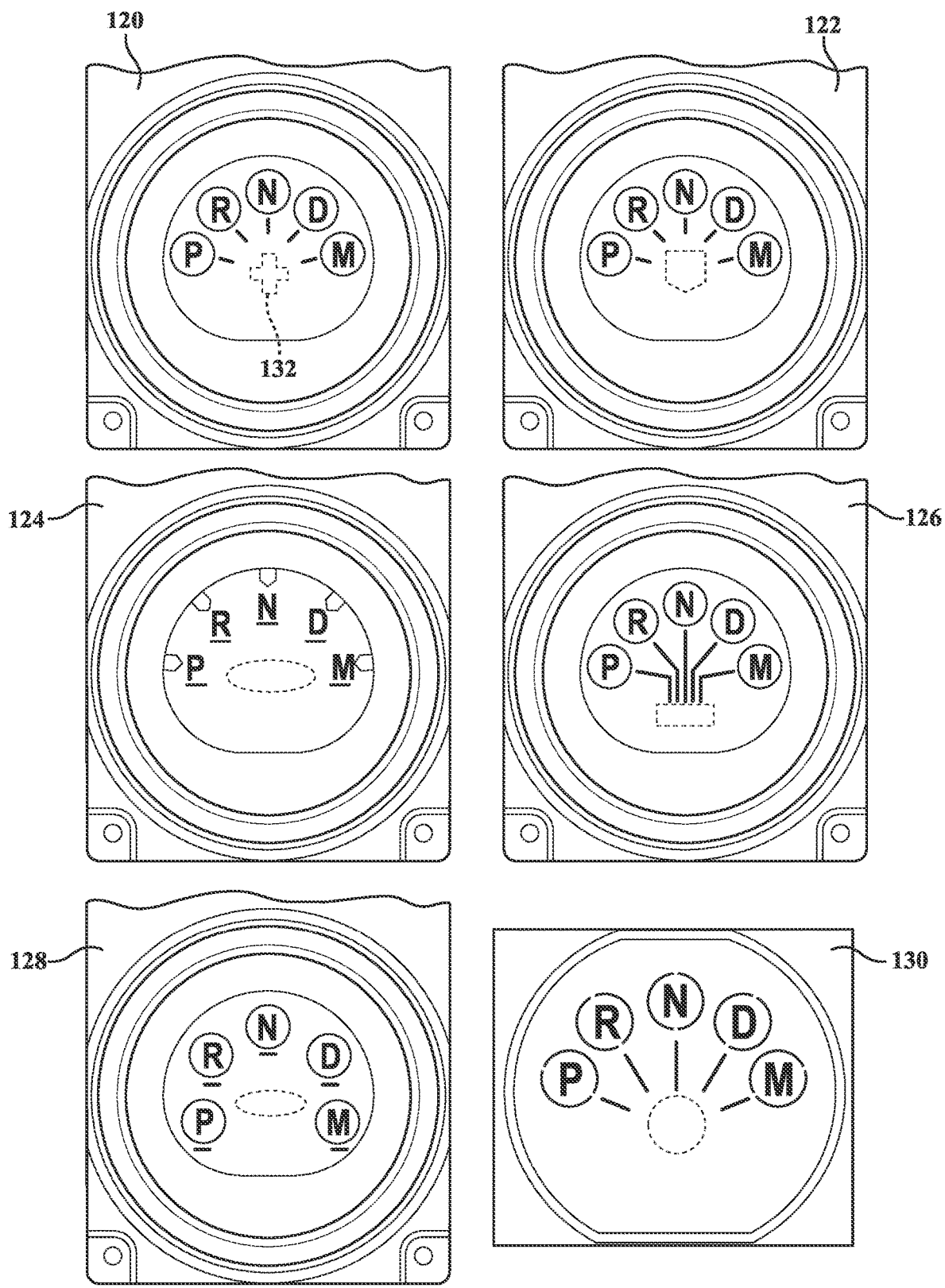
FIG. 8A illustrates a series of related illustrations of segmented display variations which can include provision of a specific template surface for the display subassembly in combination with the ability to illuminate various segments of the display via the PCBA in order to achieve numerous alternative illumination patterns.

Proceeding to FIG. 8A, a series of related illustrations are shown at each of 120, 122, 124, 126, 128 and 130 of segmented display variations (such as utilized with the ribbon cable 72 variant) and which can include provision of a specific template surface for the display subassembly in combination with the ability to illuminate various segments of the display via the PCBA in order to achieve numerous alternative illumination patterns. Additional to the shifter position designations PRNDM which can be indicated at any location of the graphical display, additional and changing graphics (such as generally represented at 132 in the subset view for display variation 120) can adapt to different shapes and stylings such as corresponding to any branded vehicle manufacturer (e.g. Ford®, G.M.®, Fiat Chrysler®, Volkswagen®) as well as any subset vehicle make or model (e.g. Mustang®, Ram®, Jeep®) and the like.

Figure 8B:
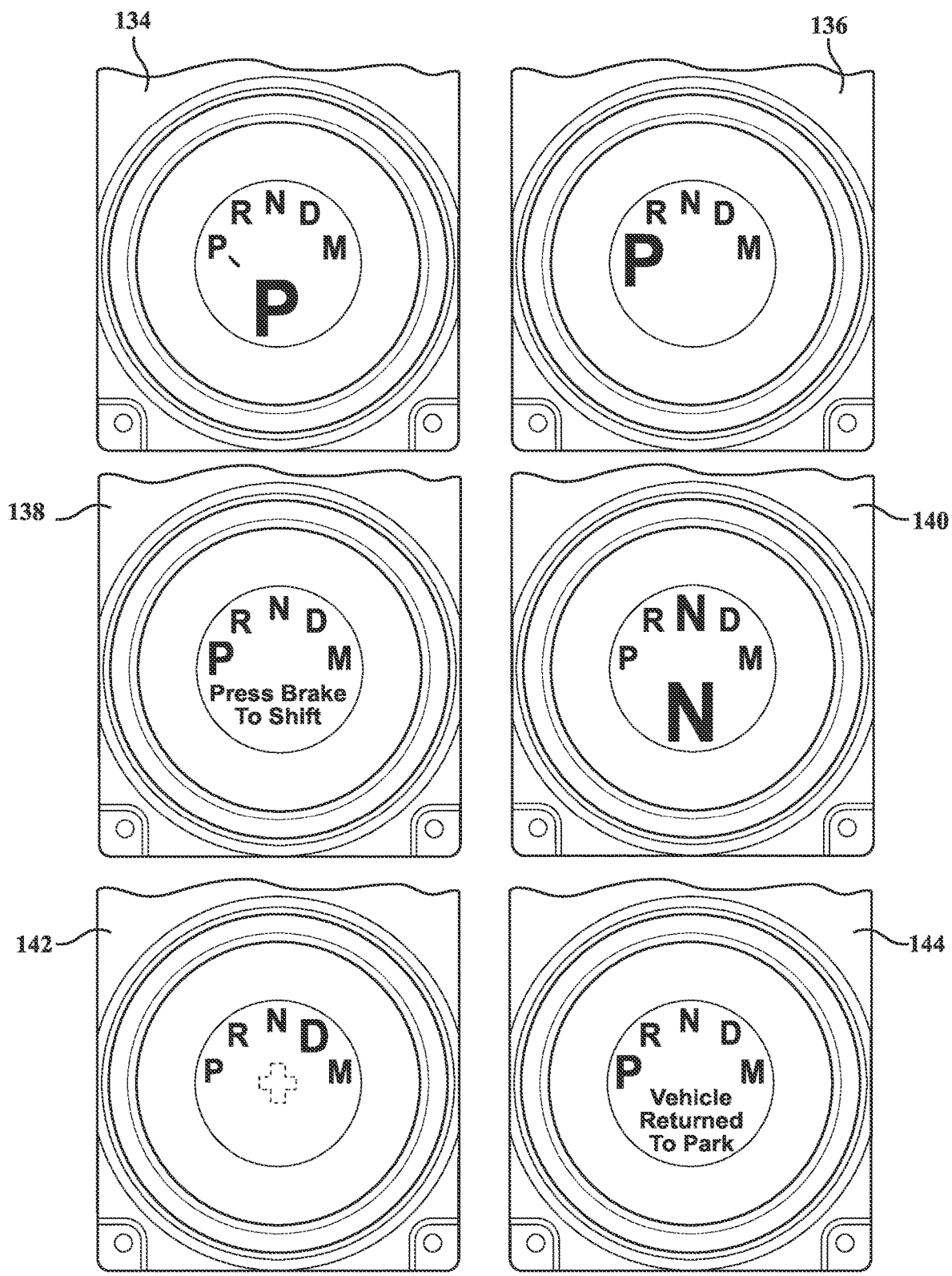
FIG. 8B is similar to FIG. 8A and illustrating a variety of TFT/OLED surface display options utilizing a generic template surface which, in combination with the remote PCBA and associated wire harness/connector, allows for limitless color and display patterns.

FIG. 8B is similar to FIG. 8A and illustrates a variety of TFT/OLED surface display options, such as using the wire harness version 70 in combination with a generic template surface 66 which, in combination with the remote PCBA 58 and associated wire harness/connector 74, allows for presentation of limitless color and display patterns. These are represented individually at 134, 136, 138, 140, 142 and 144 and which can also envision any gear (shifter position) indication methodology or strategy not limited to standard PRND depictions, as well as providing unlimited flexibility as to varying color and image representation (such as again only limited by the software inputs from the PCBA). This functionality again allows for one display to be use for any number of images thereby rendering it not tooling specific and which is otherwise required by many prior art pre-etched or painted display surfaces. It is further envisioned that the segmented images of FIG. 8A can also be duplicated on any TFT style representation.

FIG. 9 provides an illustration of a linear gate style shifter assembly, generally at 146, utilizing another variation of the graphical display subassembly of the present invention, an associated display screen for which is further referenced at 148 and likewise depicted in sectional illustration in FIG. 10. Without limitation, the screen display 148 is not limited to round displays such as associated with rotary style shifters and can alternatively be provided as a rectangular shaped display surface (as shown), or any square, octagonal or other shape incorporating any of the segmented or TFT/OLED style displays consistent with those described throughout FIGS. 1-9. It is also envisioned that the display technology can be applied to other shifter styles not limited to any of lever shifters, push button shifters, column shift configurations and the like, as well as being applicable to any other technological application within a vehicle.

FIGS. 11A-11D illustrate varying examples, at 150, 152, 154 and 156 of color and pattern schemes applicable to any shifter surface display (additional to that depicted at 148). Additional to the variations in script and supporting graphics, the individual schemes can also encompass different color patterns or combinations as made possible by the selected illuminating (LED or LCD) components configured within the display subassembly housing and which interface directly with the display surface. By comparison LED/LCD screens use a backlight to illuminate their pixels, while OLED's pixels actually produce their own light. In this fashion, OLED pixels are often referred to as "emissive", while LCD's are "transmissive".

In this fashion, all traditional functionality for lighting and indication is contained within a graphical display assembly and connected to a separate PCB (not shown) via the extending connector. Additional advantages of the present design include reduced part content (e.g. the ability to remove light pipes such as are required in prior art PC boards with LEDs) and the ability to provide higher quality graphics to the display, and as opposed to prior art sliding color screens given the ability of the present design to indicate shifter position without being dependent upon it's physical position.

Outside of the variants illustrated and disclosed herein, another possible methodology in reference to a TFT/OLED display would indicate a large character for the current E-shift position in the center of the screen, with the non-current characters being arranged in smaller font in their relative positions above the large currently indicated position. It is also envisioned that the present invention can contemplate other graphical depictions beyond those shown.

Figure 12:
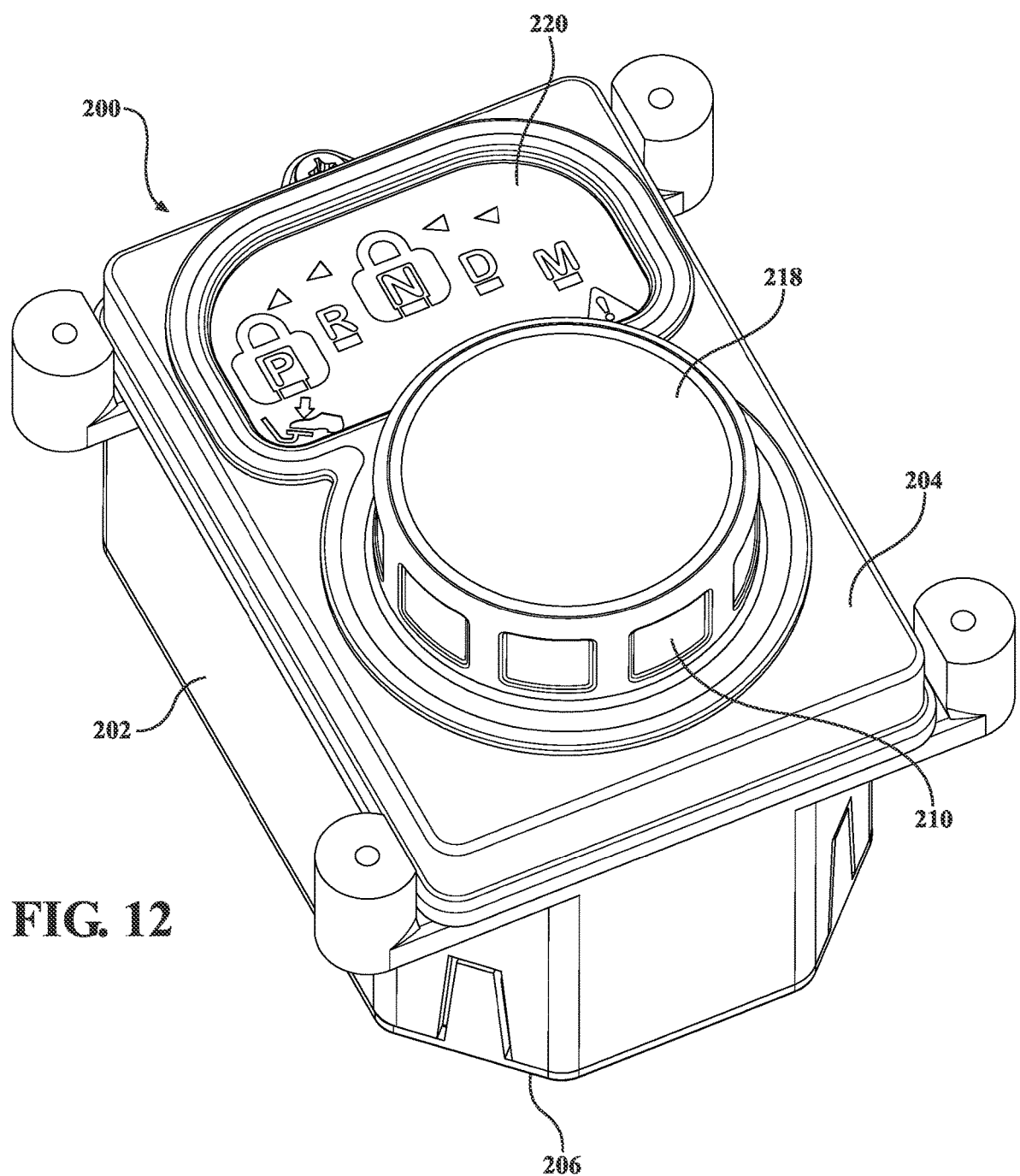
FIG. 12 is an assembled perspective of an off-rotary knob located graphical display associated with a rotary shifter assembly according to a further non-limiting embodiment.

Proceeding to FIG. 12, an assembled perspective is generally shown at 200 of an off-rotary knob located graphical display associated with a rotary shifter assembly according to a further non-limiting embodiment. Similar to the embodiment depicted in FIG. 1 at 50, components of the overall assembly include a main housing (shifter core) having a generally rectangular body 202 which can be integrated into such as a center console of a vehicle interior, the body including each of a top cover 204 and bottom cover 206 to configure an interior for supporting the package components of the assembly. Among these are included an interior mounted printed circuit board assembly 208 (PCBA as shown in the exploded view in FIG. 13) which is typically located proximate the bottom cover 206 and which can include a built in main microcontroller (similar to as previously shown at 59 in FIG. 2) or other suitable processor component.

A rotary shifter knob 210 is provided which secures to the top cover 204 via an annular shaped receiving structure 212. This includes a support screw 214 which seats through an aperture defining interior rim 216 in the rotary knob 210, the knob in turn being rotatably secured and supported upon the annular receiving structure 212 of top cover 204 in order to be rotary actuated between such as individual PRNDM positions. An optional covering cap 218 is provided for securing over the rotary knob 210, this substituting for the graphical display surface option previously shown at 66 in FIGS. 1-2.

A reconfigured display subassembly, generally represented at 220 is provided and which is mounted within an interior window (see inner extending rim 222) defined in the cop cover 204 which corresponds to an off-rotary knob location of the top cover 204, and further so that the display is positioned remote from the PCBA 208 integrated into the bottom interior of the main body 202 proximate the bottom cover 206. Also generally depicted in FIG. 13 is any suitable rotary shifter operating mechanism, such as including any type of annular detent mechanism 224 and solenoid or direct drive engaging component 226 for controlling rotary displacement of the knob 210 (either through manual manipulation of the knob or in response to a PCBA output resulting from a remote sensor input such as associated with a determined auto return to park condition).

Figure 13:
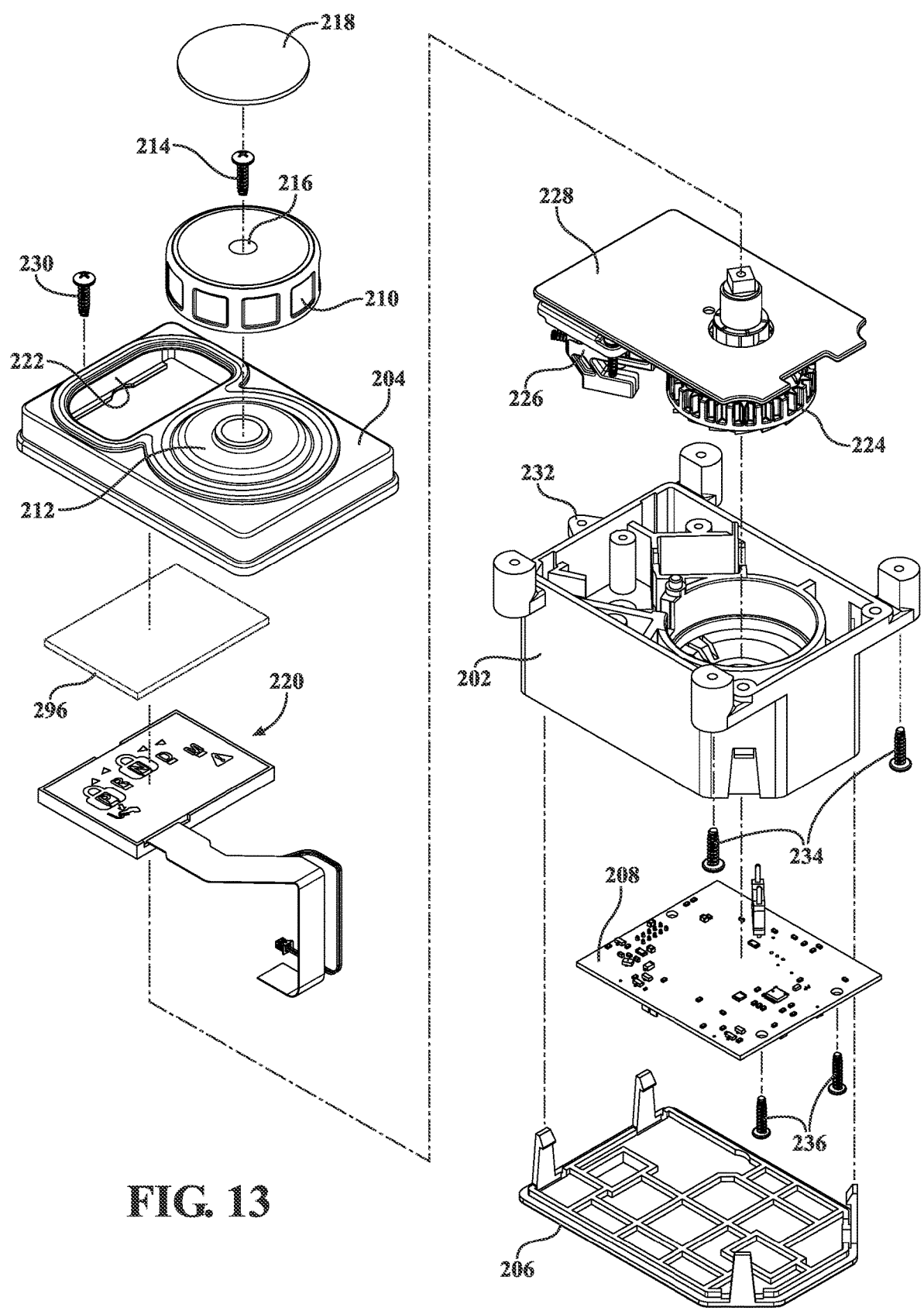
FIG. 13 is an exploded view of the assembly of FIG. 12.

Also depicted in FIG. 13 are a plurality of fasteners, such as depicted at 230 for securing the lid 204 to the main rectangular shaped body 202 (see receiving aperture 232). Additional pluralities of fasteners 234 and 236 are depicted in FIG. 13 for mounting both the bottom cover 206 and PCBA 208 to the bottom of the main rectangular shaped body 202.

Figure 14:
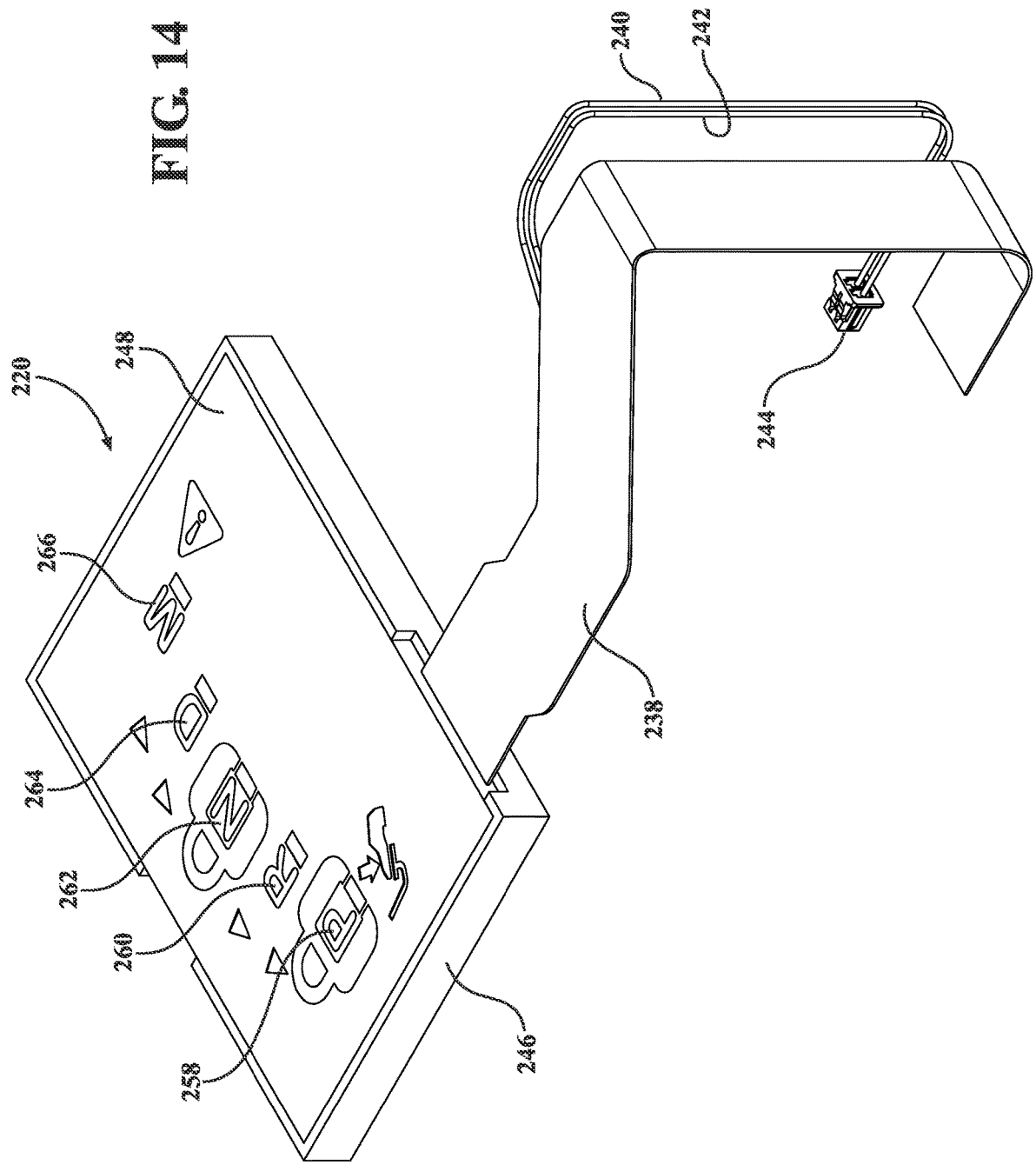
FIG. 14 is an illustration of a graphical display subassembly as depicted in FIG. 13 and which can include any variation of either of segmented or TFT/OLED displays which are capable of being illuminated via signals originating from the remote located printed circuit board assembly (PCBA) via the associated connector.

FIG. 14 is an illustration of the graphical display subassembly 220 as depicted in FIG. 13 and which can include any variation of either of the LCD glass layer separated from the silkscreen, polarizer and top glass cover (see FIG. 16) or the LED backlights mounted beneath the segmented LCD glass (see FIG. 15) displays which are capable of being illuminated via signals originating from the remote located printed circuit board assembly (PCBA) 208 via the associated connector. As shown, a first main ribbon connector 238 extends from the main housing of the graphical display subassembly 220 and connects to a first location of the PCBA 208. In a TFT/OLED configuration the ribbon can incorporate power lines into a single connector location. Also depicted are a pair of wires 240/242 which extend from the display subassembly 220 to a separate location of the PCBA 208 via a second connector 244.

Figure 15:
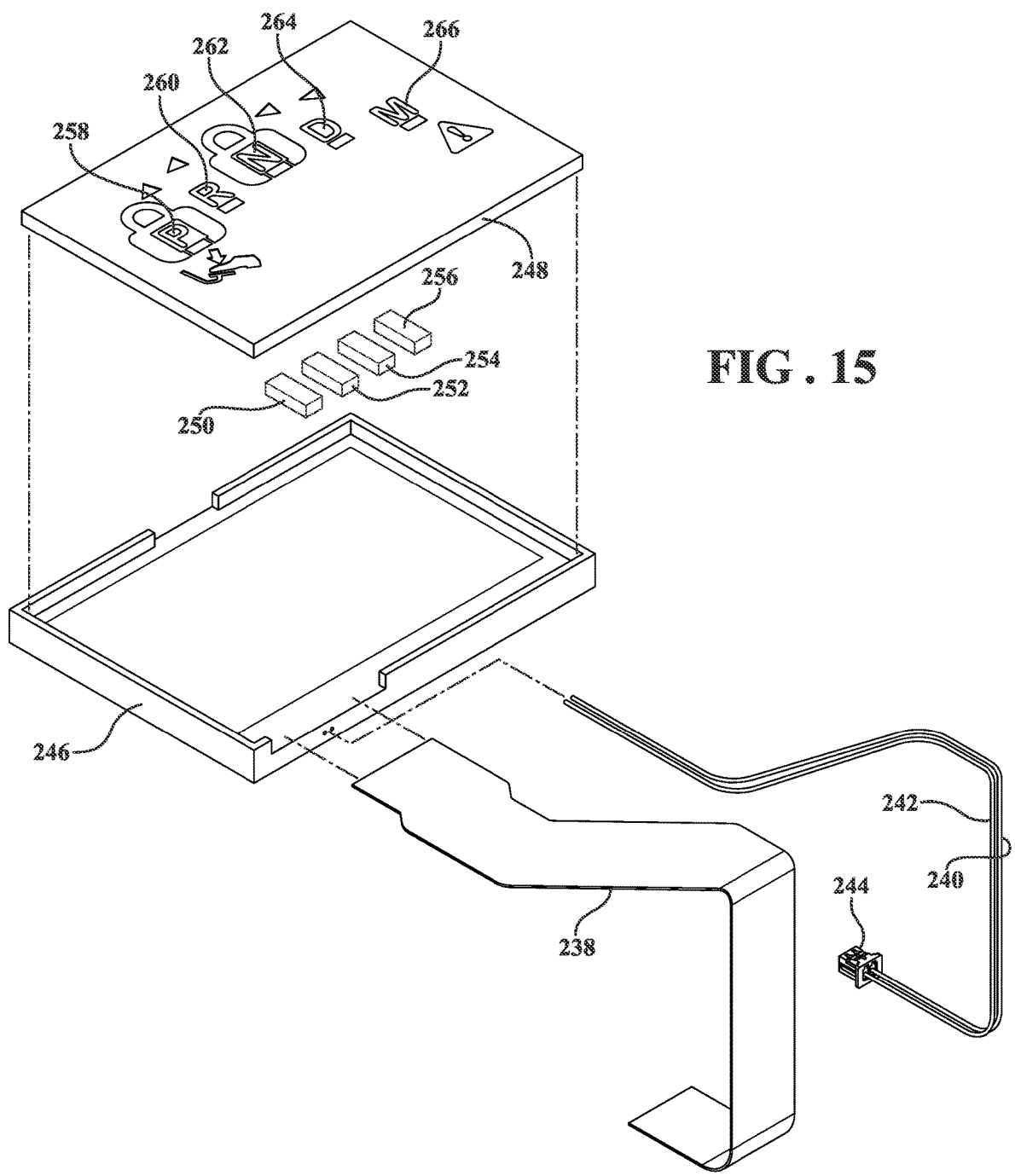
FIG. 15 is an exploded perspective of FIG. 14 and better depicting either of alternate versions of a display subassembly utilizing a backlit/LED wire harness for a TFT/OLED display or, alternatively, a cable ribbon with separate wire set for managing the LED's to a separate connector location on the PCBA, associated with a segmented display in which selected areas of the display are selectively illuminated by instructions issued by the PCBA via the connector.

FIG. 15 is an exploded perspective of FIG. 14 and better depicting either of alternate versions of a display subassembly which, in one application, utilizes the backlit/LED wire harness (ribbon cable 238 only with integrated power lines) for a TFT/OLED display. In an alternate segmented display variant, the cable ribbon 238 is provided in combination with a separate wire set 240/242 with common end connector 244 for managing a plurality of LED's when engaged to a separate connector location on the PCBA 208, and in which selected areas of the display are selectively illuminated by instructions issued by the PCBA via the connector.

A display housing base of the display subassembly is depicted in non-limiting fashion as a shallow rectangular tray shape 246 with an outer covering display panel 248. The tray 246 receives a plurality of LED components shown at 250, 252, 254 and 256 positioned at locations underneath the covering panel 248. In operation, the LED's are activated and, when the individual segments (as further described in FIG. 16) are activated, light is allowed to pass through.

The LED's 250-256 are arranged to evenly distribute the light to an underside of the panel 248 (which can be an LCD panel) incorporated into the display so that, when the individual LCD segments are activated, the light can transmit through them in a consistent manner. Also shown are each of a Park shifter position 258, Reverse shifter position 260, Neutral shifter position 262, Drive shifter position 264 and Mode shifter position 266. Other graphical depictions are referenced for each of a depiction 268 (this instructing the driver to press the brake pedal in order to shift the vehicle), Park lock depiction 270, Neutral lock depiction 272, fault lamp depiction 274 and directional arrow depictions 276, 278, 280 and 282 (see as best shown in FIGS. 17-19).

Figure 16:
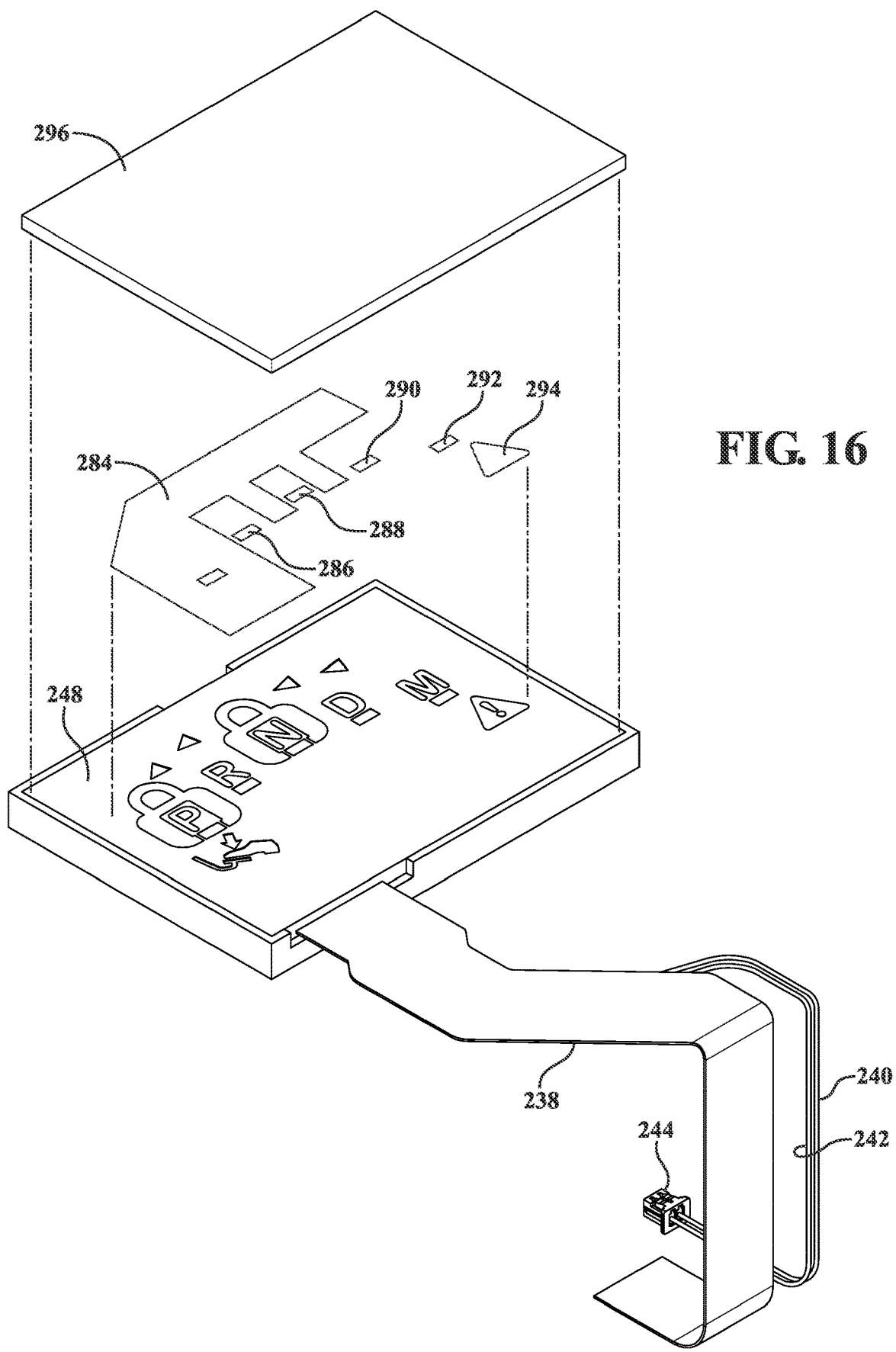
FIG. 16 is a partially exploded view proceeding from FIG. 15 of the segmented display with base LCD layer with ribbon circuits to LCD segments, intermediate silkscreen polarizer layer with polarizer such as to cover white LCD slots with red silkscreen, and top glass layer.
Figure 17:
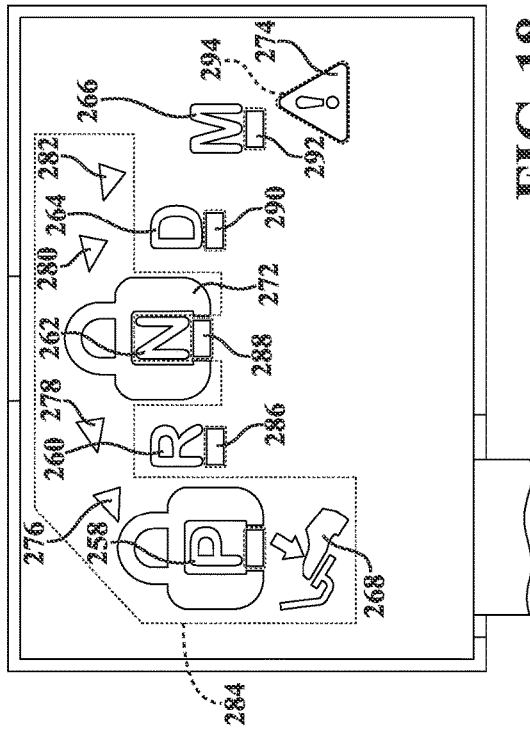
FIGS. 17-19 present a series of depictions of the segmented display surface depicted in FIG. 16 and including individual wire locations extending from the ribbon connector to the subdivided LCD segments associated with the individual shifter positions PRNDM.
Figure 18:
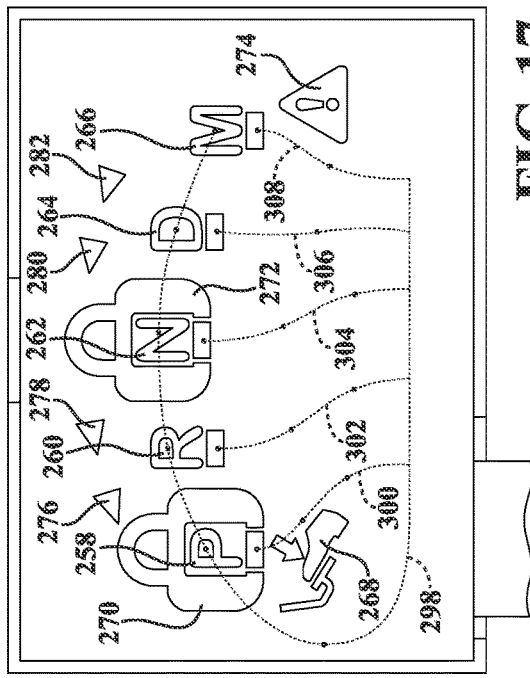
Figure 19:
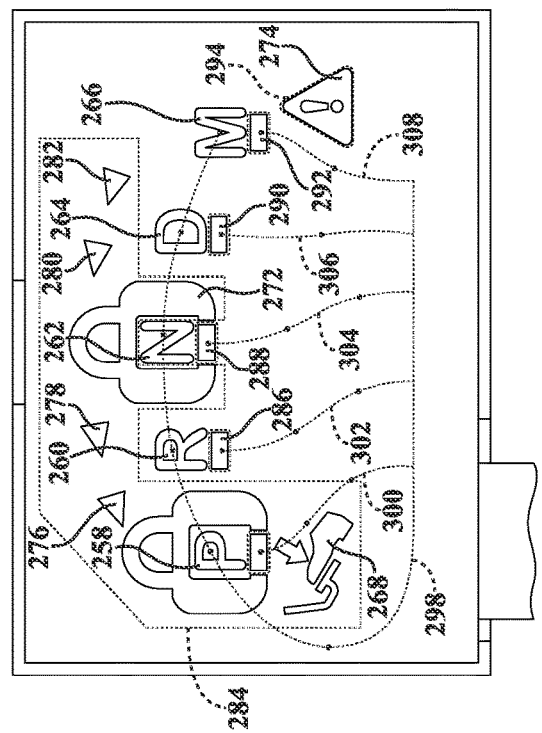

FIG. 16 is a partially exploded view proceeding from FIG. 15 of the segmented display again including the outer LCD display panel 248 (these including ribbon circuits to LCD segments as shown in FIGS. 17-19). Also depicted are a plurality of individual strips corresponding to intermediate silkscreen polarizer strips, layers or portions, at 284, 286, 288, 290, 292 and 294 each corresponding to selected display locations and including such as a polarizer to cover white LCD slots with red silkscreen, and top glass layer. Also shown at 296 is a clear or transparent cover or lens applied over the LCD panel 248.

Finally, FIGS. 17-19 present a series of depictions of the segmented display surface depicted in FIG. 16 and including individual wire trace locations extending from the ribbon connector 238 to the subdivided LCD segments 258-274 and overlaying silkscreen portions 284-294 associated with the individual shifter positions PRNDM. In the initial depiction of FIG. 17, segmented wire trace 298 progresses through each letter of the PRNDM shifter display, with additional traces 300, 302, 304, 306 and 308 corresponding to rectangular shaped identification portions located beneath each of the identified positions PRNDM, respectively.

FIG. 18 further illustrates the silkscreen polarized layers 284-294 superimposed over the PRNDM identifying scheme provided upon the LCD panel 248. FIG. 19 finally illustrates the combined superimposition of the LCD panel 248 with embedded and interconnecting segment traces 298-308 and the intermediate silkscreen layers 284-294.

Having described our invention, other and additional preferred embodiments will become apparent to those skilled in the art to which it pertains, and without deviating from the scope of the appended claims. The detailed description and drawings are further understood to be supportive of the disclosure, the scope of which being defined by the claims. While some of the best modes and other embodiments for carrying out the claimed teachings have been described in detail, various alternative designs and embodiments exist for practicing the disclosure defined in the appended claims.

The foregoing disclosure is further understood as not intended to limit the present disclosure to the precise forms or particular fields of use disclosed. As such, it is contemplated that various alternate embodiments and/or modifications to the present disclosure, whether explicitly described or implied herein, are included in light of the disclosure. Having thus described embodiments of the present disclosure, a person of ordinary skill in the art will recognize that changes may be made in form and detail without departing from the scope of the present disclosure. Thus, the present disclosure is limited only by the claims and is understood according to the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosure. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more individual separated or integrated manner, as is useful in accordance with a particular application. Additionally, any signal hatches in the drawings/figures should be considered only as exemplary, and not limiting, unless otherwise specifically specified.

We claim:

1. A graphical display integrated into a vehicle shifter assembly, comprising:
   a body integrated into a vehicle passenger compartment;
   a printed circuit board incorporated within said body;
   a top cover secured over said body and supporting a rotary shifter knob in communication with a shifter mechanism contained within said body;

a window configured within said top cover outside of said rotary shifter knob which supports a display integrating one or more illuminating components for illustrating a shifter position;

said illuminating components further including a plurality of LED's incorporated into a tray supporting said display;

an LCD panel placed over said LED's so that said light emitted therefrom is evenly distributed across an underside of said panel, said LCD panel being divided into a plurality of individual segments corresponding to selected display locations;

a plurality of polarizer portions applied against a surface of said LCD panel so as to cover any of said LCD segments having a color other than that emitted by the LED's;

a harness extending from said printed circuit board and including at least a ribbon cable extending to each of said LCD segments, said harness also powering said LED's, said printed circuit board energizing at least one of said polarizer portions to permit passage therethrough of light generated by said LED's to illuminate said selected display location.

2. The graphical display of claim 1, the vehicle passenger compartment further including a center console.

3. The graphical display of claim 1, further comprising said harness controlling any of power, intensity, activation or deactivation of said LED's.

4. The graphical display of claim 1, said display further comprising a lens overlaying a display screen.

5. The graphical display of claim 1, said printed circuit board further including a main microcontroller with a serial communication protocol not limited to any of LIN, SPI, and 12C adapted to communicate with said illuminating components in said display surface.

6. The graphical display of claim 1, said printed circuit board further including a main microcontroller with a serial communication protocol not limited to a parallel interface between the main microcontroller and said display surface.

7. The graphical display of claim 1, further comprising a parallel interface from a main microcontroller incorporated into said printed circuit board in communication with said display screen.

8. The graphical display of claim 1, said polarizer portions further comprising any of silkscreen strips or layers.

9. The graphical display of claim 1, said ribbon cable further comprising individual wires extending to each of said LCD segments, said harness also including a separate wire set extending from said printed circuit board for powering said LED's.

10. The graphical display of claim 9, further comprising a main microcontroller adapted to being incorporated into said printed circuit board for controlling said individual wires extending to each of said LCD segments.

11. The graphical display of claim 9, further comprising a common end connector of said separate wire set connecting to said printed circuit board.

12. The graphical display of claim 1, said display locations further comprising PRNDM gear positions.

13. The graphical display of claim 1, further comprising said body having a generally rectangular shape over which is affixed said top cover.

14. The graphical display of claim 12, further comprising said printed circuit board being sandwiched between said rectangular shaped body and an attached bottom cover.

* * * * *